United States Patent [19]
Hiroshima et al.

[11] 3,818,330
[45] June 18, 1974

[54] DEVICE HAVING A BRIDGE CIRCUIT FOR DETECTING FAULTS IN AN ELECTRIC NETWORK

[75] Inventors: Minoru Hiroshima, Kokubunji; Shizuhisa Watanabe, Katsuta; Takashiro Iwasaki, Kodaira; Sadao Kobayashi, Hachioji; Takahiko Tanigami, Mito; Fumiyuki Inose, Kukubunji, all of Japan

[73] Assignee: Hitachi, Ltd., Tokyo, Japan

[22] Filed: Aug. 17, 1972

[21] Appl. No.: 281,278

[52] U.S. Cl. ............................. 324/51, 340/253 H
[51] Int. Cl. ............................................. G01r 31/02
[58] Field of Search .......... 324/51, 52, 62; 340/255, 340/253 R, 253 B, 253 H

[56] References Cited
UNITED STATES PATENTS

| | | | |
|---|---|---|---|
| 647,970 | 4/1900 | Kallman | 324/51 |
| 3,178,639 | 4/1965 | Hillman | 324/51 X |
| 3,569,826 | 3/1971 | Burnett | 324/51 |
| 3,699,392 | 10/1972 | Lee et al. | 324/51 X |

Primary Examiner—Gerard R. Strecker
Attorney, Agent, or Firm—Craig and Antonelli

[57] ABSTRACT

A device for detecting faults such as burning-out, earthing, short-circuiting taking place in each of a plurality of fundamental elements in an electric network in which said fundamental elements each constituting at least one kind of circuit element such as a resistor are connected in series or in parallel to each other, said device being provided with a bridge circuit connected between two equipotential points a and b, and other two equipotential points c and d in the network, and with a comparator connected between two equipotential points in the bridge circuit to thereby detect an unbalanced load produced from the bridge circuit.

5 Claims, 6 Drawing Figures

DEVICE HAVING A BRIDGE CIRCUIT FOR DETECTING FAULTS IN AN ELECTRIC NETWORK

BACKGROUND OF THE INVENTION

1. Field of the Invention

The present invention relates to a device for detecting faults or defects such as burning-out, earthing, short-circuiting, etc., taking place in each of a plurality of fundamental elements in an electric network in which said fundamental elements each constituted of one or various kinds of circuit elements are connected in series or in parallel to each other.

2. Description of the Prior Art

In prior arts, the detection of faults taking place in a fundamental element has been effected by measuring the variation of a voltage between both terminals of the fundamental element. The application of this prior art to a resistor network comprising a plurality of fundamental elements requires high resolution power of a device for detecting the variation of the voltage as the number of the fundamental element increases. In this respect, problems arose; for example, it was difficult from a technical point of view to obtain a device having high resolution power for the fulfillment of the requirement, often resulting in an expensive device even if such devices were accomplished. Alternatively, in order to detect the faults in the network including a plurality of the above-mentioned fundamental elements without employing a device with high resolution power, there has been proposed a detecting method or device wherein the network is divided into a plurality of groups of fundamental elements in order to detect the faults independently of every divided group. Such a method, however, has been found to be unsuitable from technical and econimical points of view because of its bulky detecting circuits.

SUMMARY OF THE INVENTION

An object of the present invention is to provide a fault detecting device having a very simple construction without requiring any high resolution power.

Another object of the present invention is to provide an inexpensive fault detecting device.

In order to attain the above-mentioned objects, the fault detecting device according to the present invention is so constituted that it includes a bridge circuit connected across suitable equipotential points in the network to detect the faults taking place in the network by measuring the balance of the bridge circuit.

The most simplified one of such devices comprises a bridge circuit including four resistors each having the same value of resistance for detecting a potential variation taking place in the network to be detected, and a comparator for detecting a balanced condition of the bridge circuit. It is to be noted that only a simple comparator is required without any high resolution power because it only serves to detect the balance of the comparator.

Further it is also to be noted that the device of the present invention has an advantage that the faults in the increased fundamental elements of the network can be easily detected by measuring the balance of the last one of the bridge circuits due to the repeated or cascaded use of the bridge circuit.

DESCRIPTION OF THE PREFERRED EMBODIMENTS

The present invention will be fully described in connection with various embodiments. For purposes of simplification of the description and illustration, fundamental elements in the network are regarded as being constituted of resistor elements.

Figure 1:
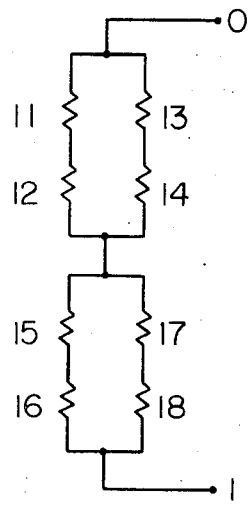
FIG. 1 is a circuit diagram showing one embodiment of a network to be detected according to the present invention.

In FIG. 1 there is shown one embodiment of a resistor network to be detected wherein resistor elements 11 to 18 have the same values of resistance. In the network as shown in FIG. 1, the resistor elements 11 and 12 are series connected, this combination being hereinafter referred to as a branch 11 − 12. The other portions where the resistor elements are series connected will be denoted in the same manner by identifying the resisters of the branch. In the network, the branches 11 − 12 and 13 − 14 are connected in parallel to each other, and these parallel-connected branches are further connected in series with parallel-connected branches 15 − 16 and 17 − 18. Terminals 0 and 1 are connected to an external circuit.

The detection of the faults in the network is usually effected by measuring a voltage variation between the terminals 0 and 1. Resolution power will be given by short-circuiting one of the resistor elements. Let the normal voltage between the terminals 0 and 1 be V and let an amount of variation of the voltage therebetween be $\Delta V$, and the resolution power can be expressed as $\Delta V/V$. Further let the value of each resistor element 11 to 18 be R, respectively, and the value of resistance as viewed from the terminals 0 and 1 is 2R when in a normal state while 5/3R when in a shortcircuited state. It follows that $\Delta V$ is 1/6V and therefore the resolution power is 1/6. This solution is based on the fact that the external circuit is a constant current source. If the external circuit is not a constant current source, then the resolution power will deteriorate to an even greater extent.

Figure 2:
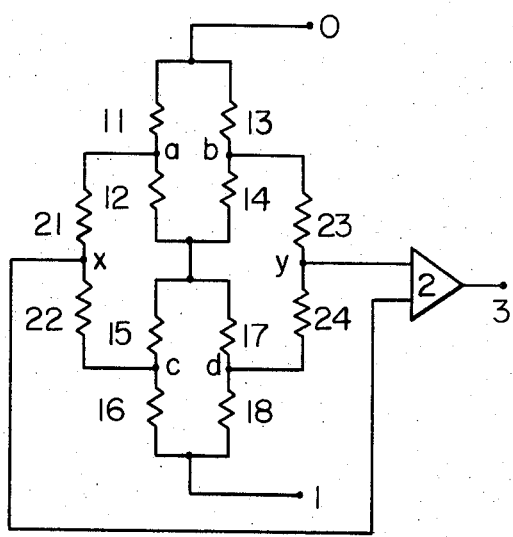
FIG. 2 is a circuit diagram showing one embodiment of a fault detecting device according to the present invention for detecting faults in the network as shown in FIG. 1.

FIG. 2 shows one embodiment of a circuit according to the present invention for detecting faults taking place in the network of FIG. 1. A bridge circuit having four bridge terminals is connected to the network in which each bridge terminal is connected to corresponding middle or connecting points $a$, $b$, $c$ and $d$ of four branches 11 – 12, 13 – 14, 15 – 16, and 17 – 18 in the network of FIG. 1. Four branches of the bridge circuit are constituted of resistor elements 21 to 24 the resistance values of which may be selected to be equal to each other. The detection of the faults taking place in the network of FIG. 1 is carried out by measuring a balanced load between points $x$ and $y$, that is, middle or connecting points of two branches 21 – 22 and 23 – 24 of the bridge circuit, respectively. A comparator 2, for example, detects the balanced load and produces the result at its output terminal 3.

In a normal state, the terminals $a$ and $b$, and the terminals $c$ and $d$ are, respectively, equipotential points with the result that terminals $x$ and $y$ in the bridge circuit are equipotential (in a balanced state). It follows that the voltage between the terminals $x$ and $y$ is zero with a "0" state in the detecting output terminal 3. On the other hand, in a state where the network is burnt-out, earthed or short-circuited, the bridge circuit becomes unbalanced, thus producing a potential difference across the terminals $x$ and $y$ with the result of the "1" state in the detecting output terminal 3. Thus the detection of the faults in the network will be effected in accordance with the above-mentioned operation.

Next, the resolution power required for the comparator 2 will be described in connection with an example wherein a resistor element is short-circuited. It is assumed that the voltage between the terminals 0 and 1 in the normal state is $V$ as mentioned above. The potential difference $\Delta V$ produced across the terminals 0 and 1 in the short-circuited network is a potential difference between the terminals $a$ and $b$ because the potential difference occurs across the terminals $a$ and $b$ while the terminals $c$ and $d$ are held equipotential. It is further assumed that the external circuit connected to the terminals 0 and 1 is a constant current source in analogy with the previously described approach to the solution of the resolution power. The voltage across the terminals 0 and 1 is 5/6 $V$ on the assumption that the external circuit is a constant current source, and therefore the voltage between both ends of the branch 13 – 14 becomes 2/6 $V$ with the result of the potential difference of 1/6 $V$ across the terminals $a$ and $b$. It will be seen that the potential difference $\Delta V$ is 1/12 $V$, half a value $\Delta V = 1/6$ $V$ previously solved. It is to be noted that the value of 1/6 $V$ represents the amount of the variation relative to the voltage $V$ in the normal state while the value of 1/12 $V$ represents the amount relative to zero, thus assuring the higher resolution power of the device in accordance with the present invention. Further, in the case where the external circuit cannot be assumed to be a constant current source, the resolution power becomes more deteriorated in the previously described method while becoming improved in accordance with the present invention. If the external circuit is substantially a constant voltage source, the prior art circuit cannot detect the fault because the potential difference $\Delta V$ is zero; on the other hand, in accordance with the present invention, the fault can be detected by the $\Delta V$ of 1/10 $V$, which is larger than 1/12 $V$ of the case of the $\Delta V$ in the constant circuit source.

Figure 3:
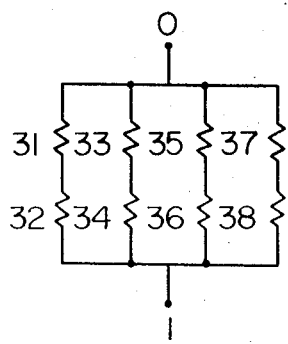
FIG. 3 is a circuit diagram showing another embodiment of a network to be detected according to the present invention.

In FIG. 3 there is shown another embodiment of the resistor network to be detected, wherein resistor elements 31 to 38 have the same resistance values corresponding to the resistor elements 11 to 18 of FIG. 1, respectively. Further, terminals 0 and 1 are connected to an external circuit, corresponding to the terminals 0 and 1 in FIG. 1. In the network, four branches constituted of two series-connected resistors 31 – 32, 33 – 34, 35 – 36, and 37 – 38 are connected in parallel to each other.

The detection of the faults in the network is usually effected by measuring the variation of the voltage across the terminals 0 and 1. Assuming that the external circuit is a constant current source similarly to the first embodiment, the resolution power $\Delta V/V$ will be obtained where $V$ represents the voltage across the terminals in the normal state and $\Delta V$ is the amount of variation in voltage when one of the resistor elements is short-circuited. Let the values of resistance of the resistor elements 31 to 38 be $R$, respectively, and the value of resistance as viewed from the terminals 0 and 1 is $R/2$ in the normal state while 2/5 $R$ in the short-circuited state, thus with the result of $\Delta V = 1/10$ $V$ and therefore the resolution power of 1/10.

Figure 4:
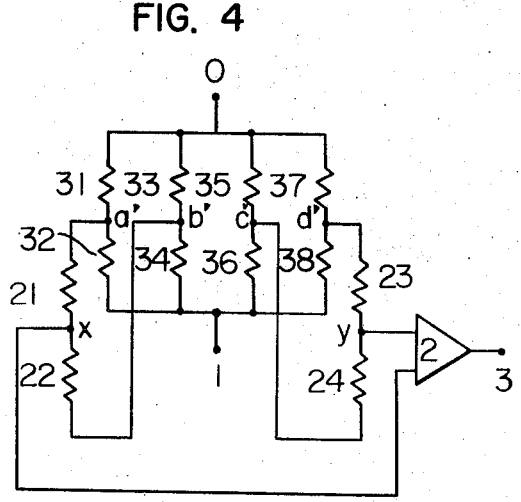
FIG. 4 is a circuit diagram showing another embodiment of a fault detecting device according to the present invention for detecting faults in the network as shown in FIG. 3.

FIG. 4 shows another embodiment of a circuit according to the present invention for detecting the faults taking place in the network of FIG. 3. A bridge circuit having four bridge terminals is connected to the network in which each bridge terminal is connected to corresponding middle connecting points $a'$, $b'$, $c'$ and $d'$ of four branches 31 – 32, 33 – 34, 35 – 36, and 37 – 38 of the network in FIG. 3. Four branches of the bridge circuit are constituted of resistor elements 21 to 24 the resistance values of which may be selected to be equal to each other. The detection of the faults taking place in the network of FIG. 3 is carried out by measuring a balanced load between points x and y, that is, middle or connecting points of two branches 21 – 22 and 23 – 24 of the bridge circuit, respectively. A comparator 2, for example, detects the balanced load and produces the result at its output terminal 3. The same discussion as described in FIG. 2 applied to the detection of the faults in the network of FIG. 3.

In a normal state, the terminals $a'$ and $b'$ and the terminals $c'$ and $d'$ are, respectively, kept equipotential with the result that the terminals $x$ and $y$ are also equipotential in the bridge circuit (in a balanced state). It follows that the voltage between the terminals $x$ and $y$ is zero and there will be a "0" state at the detecting output terminal 3. On the other hand, in a state where the network is burned-out, earthed or short-circuited, the bridge circuit becomes unbalanced, thus producing a potential difference across the terminals $x$ and $y$ with the result that the "1" state is produced at the detecting output terminal 3.

Next, the resolution power required for the comparator 2 in this embodiment will be described taking an example wherein a resistor element 31 is short-circuited as in the embodiment shown in FIG. 2. It is assumed that the voltage between the terminals 0 and 1 in the normal state is $V$ as mentioned above. The potential difference $\Delta V$ produced across the terminals 0 and 1 in the short-circuited network is half the potential difference between the terminals $a'$ and $b'$ because the potential difference occurs across the terminals $a'$ and $b'$ while the terminals $c'$ and $d'$ are held equipotential. It is further assumed that the external circuit connected to the terminal 0 and 1 is a constant current source similar to the first embodiment. The voltage across the terminals 0 and 1 is 9/10 $V$ on the assumption that the external circuit is a constant current source, and therefore the potential difference across the terminals $a'$ and $b'$ becomes 9/20 V resulting in a potential difference as much as $\Delta V = 9/40$ V. It will be seen that the value is more than twice as great as the value $\Delta V = 1/10$ V previously obtained in the embodiment as shown in FIG. 2. It is to be noted that the value of 1/10 V represents the amount of the variation relative to the voltage V in the normal state while the value of 9/40 V represents the amount relative to zero, thus assuring the high resolution power of the device in accordance with the present invention in all respects. Further, in case where the external circuit cannot be assumed to be a constant current source, the resolution power becomes more degraded in the previously described method while becoming improved in the present embodiment as in the embodiment as shown in FIG. 2. If the external circuit is assumed to be a constant voltage source, the prior art circuit cannot detect the fault because the potential difference $\Delta V$ is zero; on the other hand, in the present invention, the fault is detectable by the amount of $\Delta V$ of 1/4 V, which is larger than 9/40 V of the $\Delta V$ in the case of the constant current source.

According to the present invention, the complicated network in which the resistor elements of the network to be detected are further increased in number has its faults detected by measuring only one balancing state of the bridge circuits with a repeated or cascaded use of the bridge circuit.

Figure 5:
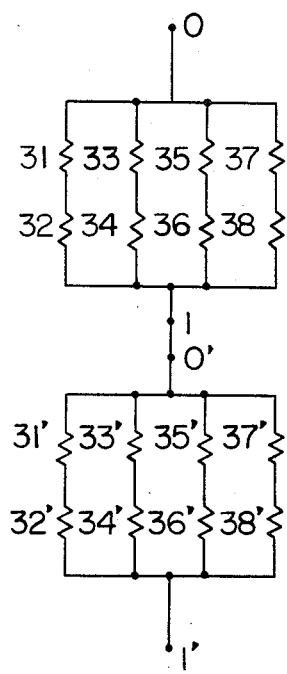
FIG. 5 is a circuit diagram showing still another embodiment of a network to be detected according to the present invention.

In FIG. 5 there is shown an embodiment of such a resistor network to be detected as mentioned above, wherein the network is formed of two series-connected networks each of which is similar to that shown in FIG. 3 and resistor elements 31 to 38 and 31' to 38' and the terminals 0, 1, and 0', 1' as shown in FIG. 5 correspond to the resistor elements 31 to 38 and the terminals 0 and 1 as shown in FIG. 3, respectively. Terminals 0 and 1' are connected to an external circuit.

The detection of the faults in the network is effected according to the above-mentioned steps by measuring the variation of a voltage between the terminals 0 and 1', the resolution power required for this instance will be obtained assuming the short-circuiting of one of the resistor elements, and the resolution power $\Delta V/V$ will be 1/20, half the value of the resolution power obtained in FIG. 3. It will be appreciated that the greater the number of resistor elements in the network, the more critical the required resolution power becomes.

In order to remove technical problems of cost required to realize such a critical high resolution power, it is a common practice to employ a plurality of detecting circuits; in this instance, two detecting circuit, i.e., a detecting circuit for measuring the voltage fluctuation between the terminals 0 and 1, and the detecting circuit for measuring a voltage fluctuation between the terminals 0' and 1'. In this case, it will be easily appreciated that the resolution power is 1/10, the same as that obtained in FIG. 3.

Figure 6:
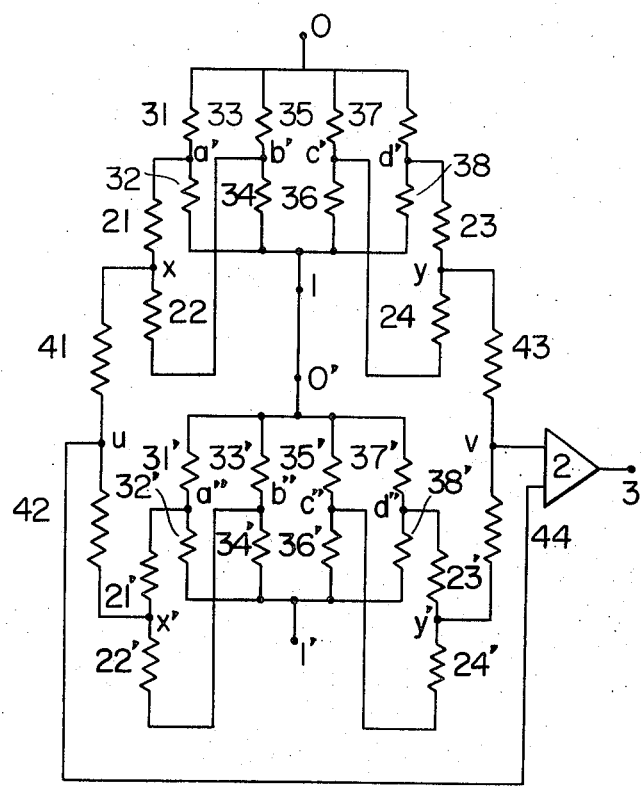
FIG. 6 is a circuit diagram showing still another embodiment of a fault detecting device according to the present invention for detecting faults in the network as shown in FIG. 5.

FIG. 6 shows still another embodiment of the circuit according to the present invention for detecting the faults taking place in the network of FIG. 5. Middle or connecting points $a'$ to $d'$ and $a''$ to $d''$ as shown in FIG. 6 correspond to the middle or connecting points $a'$ to $d'$ as shown in FIG. 4, respectively; resistor elements of the bridge circuit 21 to 24 and 21' to 24' in FIG. 6 correspond to the resistor elements 21 to 24 in FIG. 3, respectively; and middle or connecting points $x$ and $y$ of the bridge circuit in FIG. 6 correspond to middle or connecting points of the bridge circuit $x'$ and $y'$ in FIG. 3. To middle points $x, y$ and $x', y'$ of the bridge circuit is further connected to a bridge circuit which includes resistor elements 41 to 44 at it branches 41 – 42 and 43 – 44 having middle or connecting points $u$ and $v$, across which the balanced load of the bridge circuit is measured. Such a repeated or cascaded use of the bridge circuit makes it possible to detect the faults by measuring only one balanced load. A comparator 2, for example, detects the balanced load and has a detecting output terminal 3.

One of the bridge circuits including the resistor elements 21 to 24 is hereinafter referred to as a bridge circuit $xy$ after the reference marks $x$ and $y$ each being the middle points of the branches 21 – 22 and 23 – 24. This coding applied to the designation of the other bridge circuits.

In operation, it is clear from the analogy of the circuits that the bridge circuits $xy$ and $x'y'$ have the same function as the bridge circuit $xy$ shown in FIG. 4. Two bridges $xy$ and $x'y'$ are together balanced in a normal state while the bridge is unbalanced if it lies in an abnormal state. It follows that the bridge circuit $uv$ is kept balanced in the normal state, and the voltage between the terminals $u$ and $v$ is zero with a "0" state in the detecting output terminal 3. On the other hand, in the abnormal state, the bridge circuit $uv$ becomes unbalanced due to the potential difference between the terminals $x$ and $y$ or $x'$ and $y'$, thus producing a potential difference across the terminals $x$ and $y$ providing the "1" state at the detecting output terminal 3.

Next, the resolution power required for the comparator 2 in this embodiment will be described taking an example wherein one of the resistor elements 11 is short-circuited. It is assumed that the external circuit is a constant current source with the voltage across the terminals 0 and 1' designated V in the normal state. The potential difference $\Delta V$ produced across the terminals 0 and 1' in the short-circuited network has the same potential difference $\Delta V$ obtained in the embodiment of FIG. 4. Namely, the potential difference $\Delta V$ is 9/40 times as great as that between the terminals 0 and 1 in the normal state and $\Delta$ is expressed to be $9/40 \times V/2$ because the voltage between the terminals 0 and 1 is half a voltage V/2 between the terminals 0 and 1'. The potential difference $\Delta V$ to be solved is, therefore, $9/80 \times V/2$, half a $\Delta$ because of the equipotential terminals $x'$ and $y'$. Thus it is concluded that the thus solved potential difference $\Delta V$ is greater than $\Delta V = 1/10 \times V$ solved in FIG. 3 because the value of V/2 corresponds to the voltage V between the terminals in FIG. 3, thus assuring improved resolution power relatively or absolutely.

As mentioned above, the present invention has many advantages as follows:

1. The resolution power for detection can be improved relatively or absolutely in some instances; and 2. The detection is effected only by measuring an unbalanced load of one bridge circuit even if the network to be detected is complicated, thus providing a simplified detecting circuit.

The above description is based on the fact that while the network to be detected goes out of order, the bridge circuit connected to the network itself often becomes out of order. The detection according to the present invention is carried out by measuring the balanced condition of the bridge circuit, so that the present invention has a further advantage;

3. The faults taking place in the bridge circuit itself connected to the network for the detection can be detected simultaneously.

Further, the present invention has been described assuming that the network to be detected is constituted of a fundamental element such as a resistor. It is, however, readily apparent to those skilled in the art that the present invention is not limited in scope and in spirit to such a network, but may be applied also to such networks constituted of, for example, diode elements, resistor elements connected in series with the diode elements, or any other circuit conceivable.

Further, the above-mentioned description has been made taking an example of the short-circuited resistor element as the faults. It will be, however, appreciated that the faults such a burning-out or earthing, although the description has been omitted, can be detected similarly to the fault of the short-circuiting.

Furthermore, the present invention is adapted for use in other circuits than the above-mentioned parallel or series-connected network, particularly in the network of an air-bag system in an automobile, according to which an air bag is expanded upon the collision of the automobile by exploding a detonator due to ignition of an igniter to thereby destroy the seal of a high-pressure air bomb in order to introduce air contained therein to the air bag. Usually, two ignitors per one seat box totaling eight igniters are connected in series or in parallel in the air-bag system of the automobile (see FIG. 1). The fault detecting circuit according to the present invention is particularly suitable for the detection of the faults taking place in the network for igniting the igniter.

We claim:

1. A circuit for detecting faults taking place in one of a plurality of impedance elements forming a network in which said impedance elements include at least one kind of circuit element connected in series-parallel relationship to each other to provide at least two pairs of equipotential points, comprising at least one balanced bridge circuit having four terminals, two of which terminals of said bridge circuit being connected to corresponding ones of one of said pairs of equipotential points of said network, respectively, and the other two of which terminals of said bridge circuit being connected to corresponding ones of the other of said pairs of equipotential points of said network, respectively, and comparator means connected to said bridge circuit for detecting an unbalanced condition of said bridge circuit.

2. A circuit according to claim 1, wherein said bridge circuit is constituted of four resistors each having the same value of resistance.

3. An electric network comprising first, second, third and fourth circuits each including two series-connected resistors; means for connecting said first circuit to said second circuit in parallel; means for connecting said third circuit to said fourth circuit in parallel; means for connecting said parallel-connected circuits in series; means for applying a voltage across the combination of said series-connected parallel circuits, a fault detecting circuit comprising a first detecting circuit including a pair of series-connected resistors one end of which is connected to the connecting point of said series-connected resistors in said first circuit and the other of which is connected to the connecting point of said series-connected resistors in said third circuit and a second detecting circuit including a pair of series-connected resistors one end of which is connected to the connecting point of said series-connected resistors in said second circuit and the other end of which is connected to the connecting point of said series-connected resistors in said fourth circuit; and a comparator for detecting a potential difference between an electric potential at the connecting point of said series-connected resistors in said first detecting circuit and that at the connecting point of said series-connected resistors in said second detecting circuit.

4. An electric network comprising first, second, third, and fourth circuits each including two series-connected resistors; means for connecting said first to fourth circuits in parallel to each other; and means for applying a voltage across the combination of said parallel-connected circuits, a fault detecting circuit including a pair of series-connected resistors one end of which is connected to the connecting point of said series-connected resistors in said first circuit and the other end of which is connected to the connected point of said series-connected resistors in said second circuit; a second detecting circuit including a pair of series-connected resistors one end of which is connected to the connecting point of said series-connected resistors in said third circuit and the other end of which is connected to the connecting point of said series-connected resistors in said fourth circuit; and a comparator for detecting a potential difference between an electric potential at the connecting point of said series-connected resistors in said first detecting circuit and that at the connecting point of said series-connected resistors in said second detecting circuit.

5. An electric network comprising first, second, third, fourth, fifth, sixth, seventh, and eighth circuits each including two series-connected resistors; means for connecting said first to fourth circuits in parallel; means for connecting said fifth to eighth circuits in parallel; means for connecting said parallel-connected circuit of said first to fourth circuits in series to that of said fifth to eight circuits; and means for applying a voltage to terminals of said series-connected circuits, a fault detecting circuit comprising a first detecting circuit including a pair of series-connected resistors one end of which is connected to the connecting point of said series connected resistors in said first circuit and the other end of which is connected to the connecting point of said series-connected resistors in said second circuit; a second detecting circuit including a pair of series-connected resistors one end of which is connected to the connecting point of said series-connected resistors in said third circuit and the other end of which is connected to the connecting point of said series-connected resistors in said fourth circuit; a third detecting circuit including a pair of series-connected resistors one end of which is connected to the connecting point of said series-connected resistors in said fifth circuit and the other end of which is connected to the connecting point of said series-connected resistors in said sixth circuit; a fourth detecting circuit including a pair of series-connected resistors one end of which is connected to the connecting point of said series-connected resistors in said seventh circuit and the other end of which is connected to the connecting point of said series-connected resistors in said eighth circuit; a fifth detecting circuit including a pair of series-connected resistors one end of which is connected to the connecting point of said series-connected resistors in said first detecting circuit and the other end of which is connected to the connecting point of said series-connected resistors in said third detecting circuit; a sixth detecting circuit including a pair of series-connected resistors one end of which is connected to the connecting point of said series-connected resistors in said second detecting circuit and the other end of which is connected to the connecting point of said series-connected resistors in said fourth detecting circuit; and a comparator for detecting a pointial difference between an electric potential at the connecting point of said series-connected resistors in said fifth detecting circuit and that of the connecting point of said series-connected resistors in said sixth detecting circuit.

* * * * *